United States Patent
Ohtomo et al.

(10) Patent No.: US 10,634,497 B2
(45) Date of Patent: Apr. 28, 2020

(54) SHAFT SUPPORT STRUCTURE, LASER BEAM PROJECTING UNIT AND SURVEYING INSTRUMENT

(71) Applicant: TOPCON Corporation, Tokyo-to (JP)

(72) Inventors: Fumio Ohtomo, Saitama (JP); Hideyuki Matsumoto, Tokyo-to (JP); Kazuki Osaragi, Tokyo-to (JP); Takahiro Inoue, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 303 days.

(21) Appl. No.: 15/658,779

(22) Filed: Jul. 25, 2017

(65) Prior Publication Data

US 2018/0038690 A1 Feb. 8, 2018

(30) Foreign Application Priority Data

Aug. 3, 2016 (JP) .................. 2016-152612

(51) Int. Cl.
| | |
|---|---|
| *G01S 17/08* | (2006.01) |
| *G01S 17/46* | (2006.01) |
| *G02B 5/04* | (2006.01) |
| *G01C 15/00* | (2006.01) |
| *G01B 11/00* | (2006.01) |
| *G01D 5/347* | (2006.01) |
| *G02B 27/20* | (2006.01) |
| *H02K 7/08* | (2006.01) |

(52) U.S. Cl.
CPC .......... *G01C 15/002* (2013.01); *G01B 11/002* (2013.01); *G01D 5/3473* (2013.01); *G01S 17/08* (2013.01); *G01S 17/46* (2013.01); *G02B 5/04* (2013.01); *G02B 27/20* (2013.01); *H02K 7/085* (2013.01)

(58) Field of Classification Search
CPC ....... G01C 15/002; G01S 17/08; G01S 17/46; G01B 11/002; H02K 7/085; G02B 5/04; G02B 27/20; G01D 5/3473
USPC ........................................ 356/5.01
See application file for complete search history.

(56) References Cited

U.S. PATENT DOCUMENTS 7,948,132 B2 * 5/2011 Tanaka .................. H02K 21/24
 310/51
8,823,235 B2 * 9/2014 Watanabe ............ H02K 1/2793
 310/156.32

(Continued)

FOREIGN PATENT DOCUMENTS

| JP | 6-307439 A | 11/1994 |
| JP | 2011-24291 A | 2/2011 |
| JP | 2016-13008 A | 1/2016 |

*Primary Examiner* — Daniel L Murphy
(74) *Attorney, Agent, or Firm* — Nields, Lemack & Frame, LLC

(57) ABSTRACT

The invention provides a laser beam projecting unit in which a hollow rotation shaft is provided on a fixed portion via one bearing, a rotor of an axial gap-type motor is provided on one end portion of the rotation shaft, a stator of the axial gap-type motor is provided on the fixed portion so as to confront the rotor, an attracting force between the rotor and the stator acts on the bearing as a pressurization, an angle detector for detecting a rotation angle of the rotation shaft is provided on the other end portion of the rotation shaft, a deflection optical component is provided inside the rotation shaft, and a laser beam is projected through the deflection optical component.

7 Claims, 6 Drawing Sheets

(56) References Cited

U.S. PATENT DOCUMENTS

| | | | | |
|---|---|---|---|---|
| 2004/0176261 A1* | 9/2004 | Tojou | ................... | C10M 105/38 |
| | | | | 508/485 |
| 2015/0380992 A1* | 12/2015 | Enomoto | ............... | H02K 1/182 |
| | | | | 310/43 |
| 2017/0155305 A1 | 6/2017 | Takayama et al. | | |

* cited by examiner

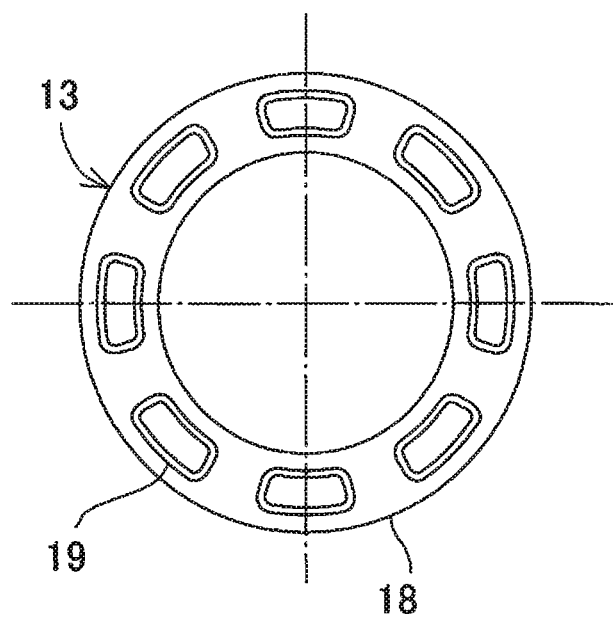
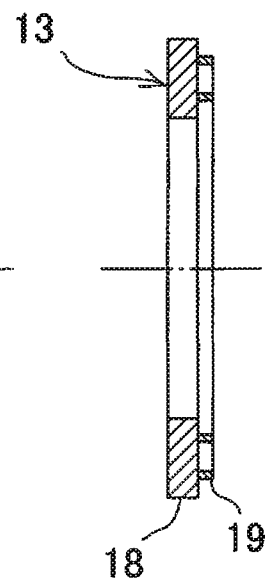
FIG. 3A  FIG. 3B
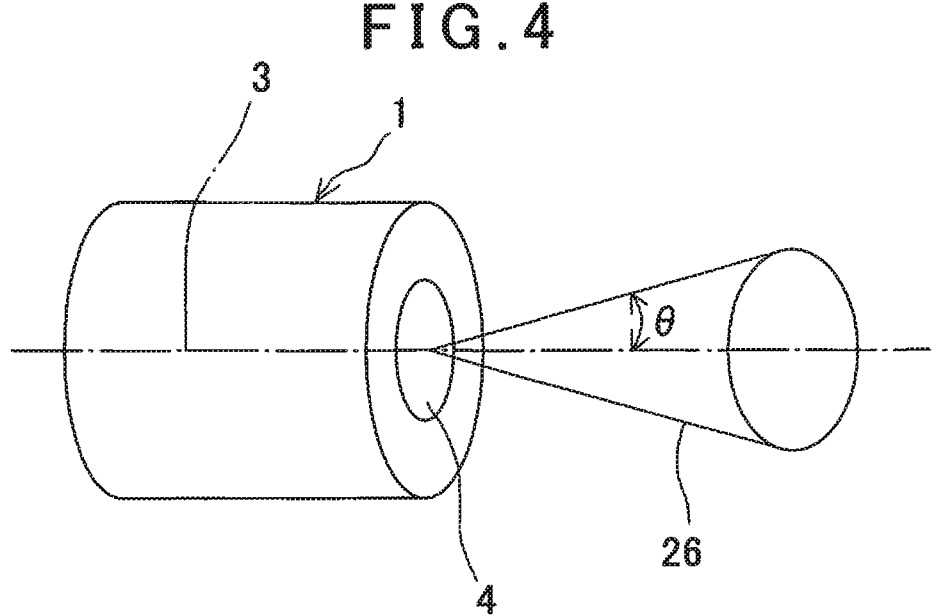
FIG. 4

SHAFT SUPPORT STRUCTURE, LASER BEAM PROJECTING UNIT AND SURVEYING INSTRUMENT

BACKGROUND OF THE INVENTION

The present invention relates to a shaft support structure which maintains a rotation accuracy of a rotation shaft and simplifies a structure, a laser beam projecting unit including the shaft support structure and a surveying instrument including the laser beam projecting unit.

A rotation unit of a precision machine such as a surveying machine or the like requires a high rotation accuracy, and a runout of the rotation shaft requires an accuracy by a unit of a second.

In order to achieve this high accuracy, in a shaft support structure of a conventional rotation shaft, the rotation shaft is supported by two bearings, a spring is provided between the two bearings, the spring applies a pressurization for getting closer to or for leaving away from to the two bearings and a gap present in the bearings is suppressed.

For this reason, the number of components is large, a structure of a shaft support portion becomes large-sized, and further, each component requires the high accuracy and thus, a manufacturing cost increases.

SUMMARY OF THE INVENTION

It is an object of the present invention to provide a shaft support structure having a simple structure and with a high accuracy, a laser beam projecting unit having the shaft support structure, and a surveying instrument including the laser beam projecting unit.

In a shaft support structure according to the present invention, a rotation shaft is provided on a fixed portion via one bearing, a rotor of an axial gap-type motor is provided on one end portion of the rotation shaft, a stator of the axial gap-type motor is provided on the fixed portion so as to confront the rotor, and an attracting force between the rotor and the stator acts on the bearing as a pressurization.

Further, in a laser beam projecting unit according to the present invention, a hollow rotation shaft is provided on a fixed portion via one bearing, a rotor of an axial gap-type motor is provided on one end portion of the rotation shaft, a stator of the axial gap-type motor is provided on the fixed portion so as to confront the rotor, an attracting force between the rotor and the stator acts on the bearing as a pressurization, an angle detector for detecting a rotation angle of the rotation shaft is provided on the other end portion of the rotation shaft, a deflection optical component is provided inside the rotation shaft, and a laser beam is projected through the deflection optical component.

Further, in the laser beam projecting unit according to the present invention, the deflection optical component is a prism.

Further, in the laser beam projecting unit according to the present invention, the deflection optical component is a Fresnel prism.

Further, in the laser beam projecting unit according to the present invention, a plurality of the laser beam projecting units are continuously provided on the same axis.

Further, a surveying instrument according to the present invention comprises a leveling unit, a horizontal rotation unit provided on the leveling unit, a frame unit provided on the horizontal rotation unit and rotatable in a horizontal direction, a horizontal angle detector for detecting a horizontal rotation angle of the frame unit and a laser beam projecting device supported by the frame unit, wherein the laser beam projecting device has a distance measuring unit for projecting a distance measuring light and for receiving a reflected distance measuring light from an object to be measured and for performing a distance measurement to the object to be measured, a control device, and the laser beam projecting unit provided on an optical axis of the distance measuring unit and the distance measuring light is configured to be projected through the laser beam projecting unit, and wherein the control device obtains a three-dimensional coordinate of a measurement point based on a distance measurement result obtained by the distance measuring unit and detection results from the horizontal angle detector and the angle detector.

Furthermore, in the surveying instrument according to the present invention, the distance measuring light is scanned within a required range by cooperating the rotation of the deflection optical component by the axial gap-type motor and a horizontal rotation of the frame unit by the horizontal rotation unit and point cloud data of a required range is obtained by the distance measuring unit.

According to the present invention, in the shaft support structure, a rotation shaft is provided on a fixed portion via one bearing, a rotor of an axial gap-type motor is provided on one end portion of the rotation shaft, a stator of the axial gap-type motor is provided on the fixed portion so as to confront the rotor, and an attracting force between the rotor and the stator acts on the bearing as a pressurization. As a result, there is no need to additionally provide a pressurization applying means for suppressing a gap between the bearings, and a small-sized and highly accurate bearing is obtained.

Further, according to the present invention, in the laser beam projecting unit, a hollow rotation shaft is provided on a fixed portion via one bearing, a rotor of an axial gap-type motor is provided on one end portion of the rotation shaft, a stator of the axial gap-type motor is provided on the fixed portion so as to confront the rotor, an attracting force between the rotor and the stator acts on the bearing as a pressurization, an angle detector for detecting a rotation angle of the rotation shaft is provided on the other end portion of the rotation shaft, a deflection optical component is provided inside the rotation shaft, and a laser beam is projected through the deflection optical component. As a result, there is no need to additionally provide the pressurization applying means for suppressing a gap between the bearings, and a small-sized and highly accurate bearing is obtained, and further, the deflection optical component is provided integrally with an output shaft, and a mechanism for rotatably supporting the deflection optical component and power transmission means for transmitting a rotation of a motor to the deflection optical component can be omitted, and the number of components, a size and a weight can be reduced.

Furthermore, according to the present invention, the surveying instrument comprises a leveling unit, a horizontal rotation unit provided on the leveling unit, a frame unit provided on the horizontal rotation unit and rotatable in a horizontal direction, a horizontal angle detector for detecting a horizontal rotation angle of the frame unit and a laser beam projecting device supported by the frame unit, wherein the laser beam projecting device has a distance measuring unit for projecting a distance measuring light and for receiving a reflected distance measuring light from an object to be measured and for performing a distance measurement to the object to be measured, a control device, and the laser beam projecting unit provided on an optical axis of the distance measuring unit and the distance measuring light is configured to be projected through the laser beam projecting unit, and wherein the control device obtains a three-dimensional coordinate of a measurement point based on a distance measurement result obtained by the distance measuring unit and detection results from the horizontal angle detector and the angle detector. As a result, the surveying instrument can be realized, which has a small-sized and highly accurate shaft support structure and a smaller number of components, is capable of deflection projection of the distance measuring light by a small-sized and light-weighted deflecting unit, and inexpensive and simple.

BRIEF DESCRIPTION OF THE DRAWINGS

FIG. 2A and FIG. 2B are explanatory drawings of a rotor of an axial gap-type motor used in the first embodiment, in which FIG. 2A is a front view and FIG. 2B is a cross-sectional view.

FIG. 3A and FIG. 3B are explanatory drawings of a stator of an axial gap-type motor used in the first embodiment, in which FIG. 3A is a front view and FIG. 3B is a cross-sectional view.

FIG. 4 is an explanatory drawing showing a deflected state of a laser beam by a laser beam projecting unit according to the present embodiment.

DETAILED DESCRIPTION OF PREFERRED EMBODIMENTS

A description will be given below on embodiments of the present invention by referring to the attached drawings.

Figure 1:
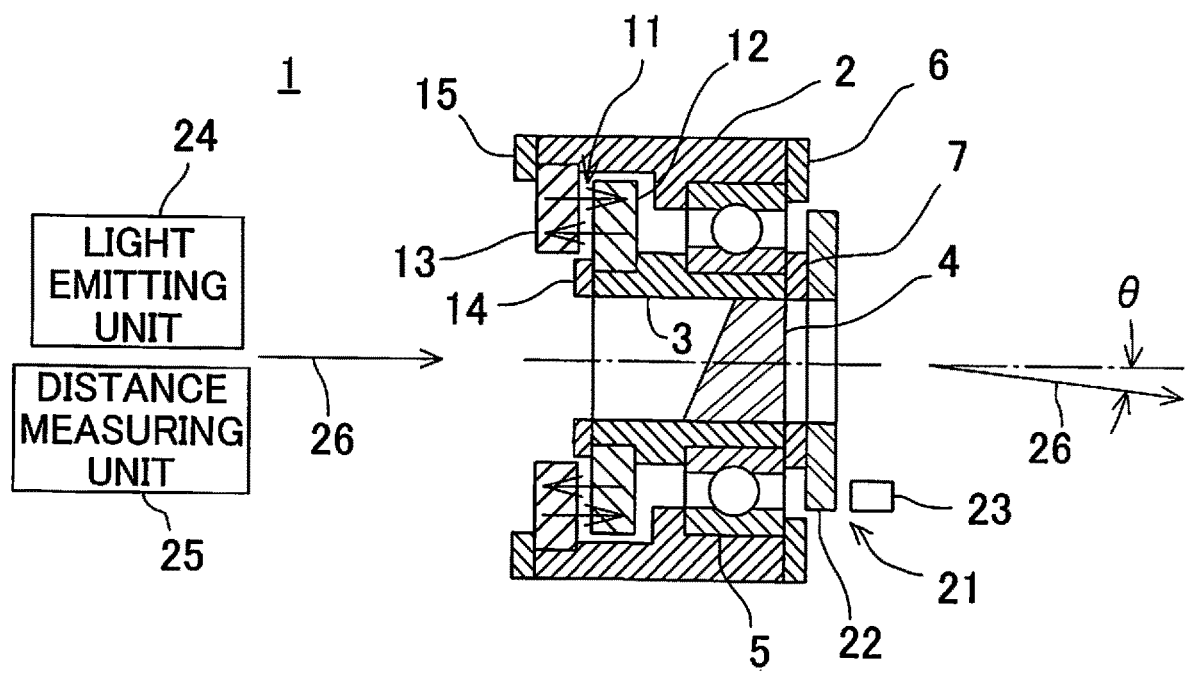
FIG. 1 is a cross-sectional view showing a first embodiment of the present invention.
Figure 2A:
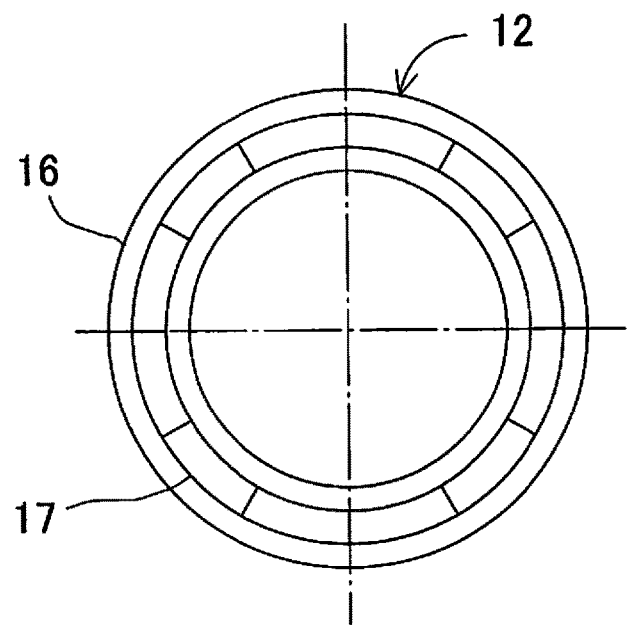
Figure 2B:
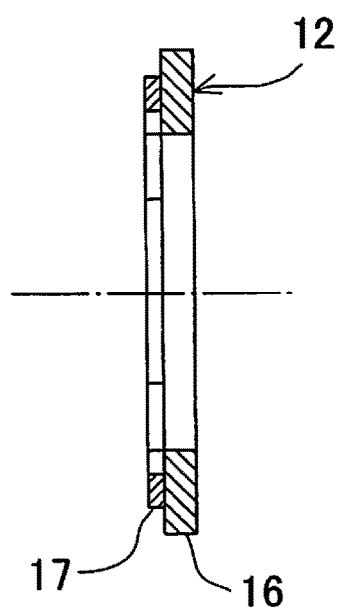

In FIG. 1, a description will be given on a laser beam projecting unit 1 having a shaft support structure according to a first embodiment of the present invention.

In FIG. 1, reference numeral 2 denotes a bearing housing as a fixed portion, and reference numeral 3 denotes a hollow rotation shaft also serving as a prism holder. In the rotation shaft 3, a prism 4 as a deflection optical component is provided. The prism 4 is fabricated so as to deflect an optical axis of a transmitted beam by a required angle θ, e.g., 10°.

The rotation shaft 3 is rotatably supported by the bearing housing 2 via one ball bearing 5.

The ball bearing 5 is fitted in the bearing housing 2 without a gap and is fixed by an outer ring stopper 6 in an axial direction without a gap. Further, the ball bearing 5 is fitted in one end portion of the rotation shaft 3 without a gap and is fixed by an inner ring stopper 7 in the axial direction without a gap.

Between the other end portion of the rotation shaft 3 and the bearing housing 2, an axial gap-type motor 11 is provided.

A description will be given briefly on the axial gap-type motor 11 by referring to FIG. 2A, FIG. 2B, FIG. 3A and FIG. 3B.

The axial gap-type motor 11 mainly has a rotor 12 which is designed in a ring-plate shape and is concentric with the rotation shaft 3 and a stator 13 which is designed in a ring-plate shape and is concentric with the rotation shaft 3.

The rotor 12 is fitted in the other end portion of the rotation shaft 3 without a gap and is fixed to the rotation shaft 3 by a rotor stopper 14. The rotor 12 is not in contact with the bearing housing 2. The stator 13 is fitted in the bearing housing 2 with a predetermined gap with respect to the rotor 12 and is fixed to the bearing housing 2 by a stator stopper 15.

The rotor 12 has a ring disc-shaped rotor yoke 16 of a magnetic material and a predetermined number of magnets 17 fixed to a surface confronted the stator 13 in the rotor yoke 16. The magnets 17 are arranged at a predetermined interval on a circumference concentric with the rotation shaft 3.

The stator 13 has a ring disc-shaped stator yoke 18 of a magnetic material and a predetermined number of coils 19 fixed to a surface confronted the rotor yoke 16 in the stator yoke 18. The coils 19 confront the magnets 17 and are arranged at a predetermined interval on a circumference concentric with the rotation shaft 3.

By controlling timing and polarity of a driving current conducted through the coils 19, the rotor 12 is rotated and the rotation is controlled.

By means of a magnetic field formed by the magnets 17 and the coils 19, an attracting force acts between the rotor 12 and the stator 13, and a thrust force acts in the axial direction in the rotation shaft 3 by the attracting force. Therefore, to the ball bearing 5, a pressurization acts by the thrust force and a runout of the rotation shaft 3 is suppressed.

An encoder 21 as an angle detector is provided on the rotation shaft 3 and a rotation angle of the rotation shaft 3 is detected by the encoder 21. In FIG. 1, reference numeral 22 denotes a pattern ring and reference numeral 23 denotes a sensor. The pattern ring 22 is mounted on the rotation shaft 3 and a pattern for detecting an angle (not shown) is formed on the pattern ring 22. The sensor 23 is provided on a fixed side (the bearing housing 2 side), reads the pattern for detecting an angle and produces an angle detection signal.

Further, reference numeral 24 denotes a light emitting unit for emitting a laser beam 26 and reference numeral 25 denotes a distance measuring unit for receiving a reflected light from an object to be measured and for performing a distance measurement.

A description will be given below on an action of the laser beam projecting unit 1.

By conducting a driving current to the coils 19, the rotor 12 is rotated and the rotation shaft 3 is rotated integrally with the rotor 12. That is to say, a rotation force of the axial gap-type motor 11 is transmitted to the rotation shaft 3 and the rotation shaft 3 acts as an output shaft of the axial gap-type motor 11. A rotation angle of the rotation shaft 3 is detected by the encoder 21.

By means of the magnetic field formed by the magnets 17, regardless of conduction or non-conduction to the coils 19, the attracting force acts between the rotor 12 and the stator 13 and the pressurization acts on the ball baring 5 at all times. Therefore, the runout of the rotation shaft 3 is suppressed even in a stopped state.

When the axial gap-type motor 11 rotates the rotor 12, the prism 4 is rotated integrally with the rotation shaft 3.

The laser beam 26 transmitted through the prism 4 is deflected by an optical action of the prism 4. The laser beam 26 transmitted through the prism 4 is rotated around an axis of the rotation shaft 3 together with the rotation of the prism 4. That is to say, the laser beam 26 is scanned in a range of a deflection angle θ (θ=±10°, for example) (see FIG. 4).

Further, a projecting direction of the laser beam 26 is detected by the encoder 21.

In the present embodiment, a motor (a rotation driving unit), a deflecting unit and a scanning unit of the laser beam (a rotation projecting unit) are integrated, and further, there is no need to additionally provide a mechanism which causes the pressurization to act on the bearing, and thereby the structure is a small-sized and simple.

Further, since a prism is used as the deflecting means, an influence of the runout of the shaft is not as large as a reflection mirror and thereby, the high rotation accuracy can be obtained.

Further, the prism 4 is directly held by the rotation shaft 3, a mass of the rotation portion is small, and the prism 4 can be rotated at a high speed by the axial gap-type motor 11.

It is to be noted that a magnetic sensor may be used instead of the encoder 21 and the ball bearing 5 may be a cross bearing. Further, in order to obtain a large deflection angle, a plurality of the prisms 4 may be provided in the rotation shaft 3.

Figure 5:
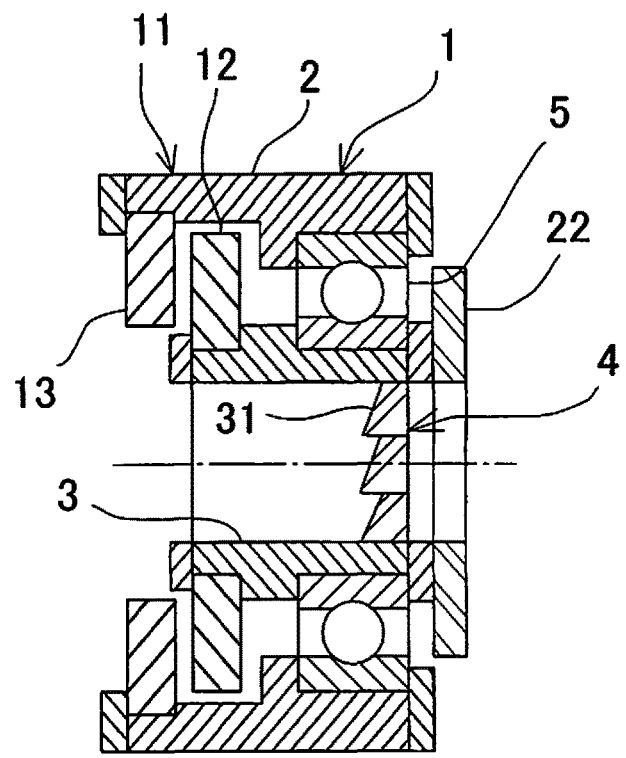
FIG. 5 is a cross-sectional view showing a second embodiment of the present invention.

FIG. 5 shows a second embodiment.

The second embodiment uses a Fresnel prism as the prism 4 shown in the first embodiment, which is constituted by a plurality of prism elements 31.

The prism element 31 is a rod-shaped prism obtained by dividing a circle by a plurality of parallel parting lines and each of the prism elements 31 has the same optical characteristic. The prism 4 in the second embodiment is constituted in a disk-shape by assembling the prism elements 31.

By using the Fresnel prism as the prism 4, a thickness of the prism 4 can be reduced, and a weight can be reduced.

Further, the prism 4 may be the Fresnel prism which is molded.

Figure 6:
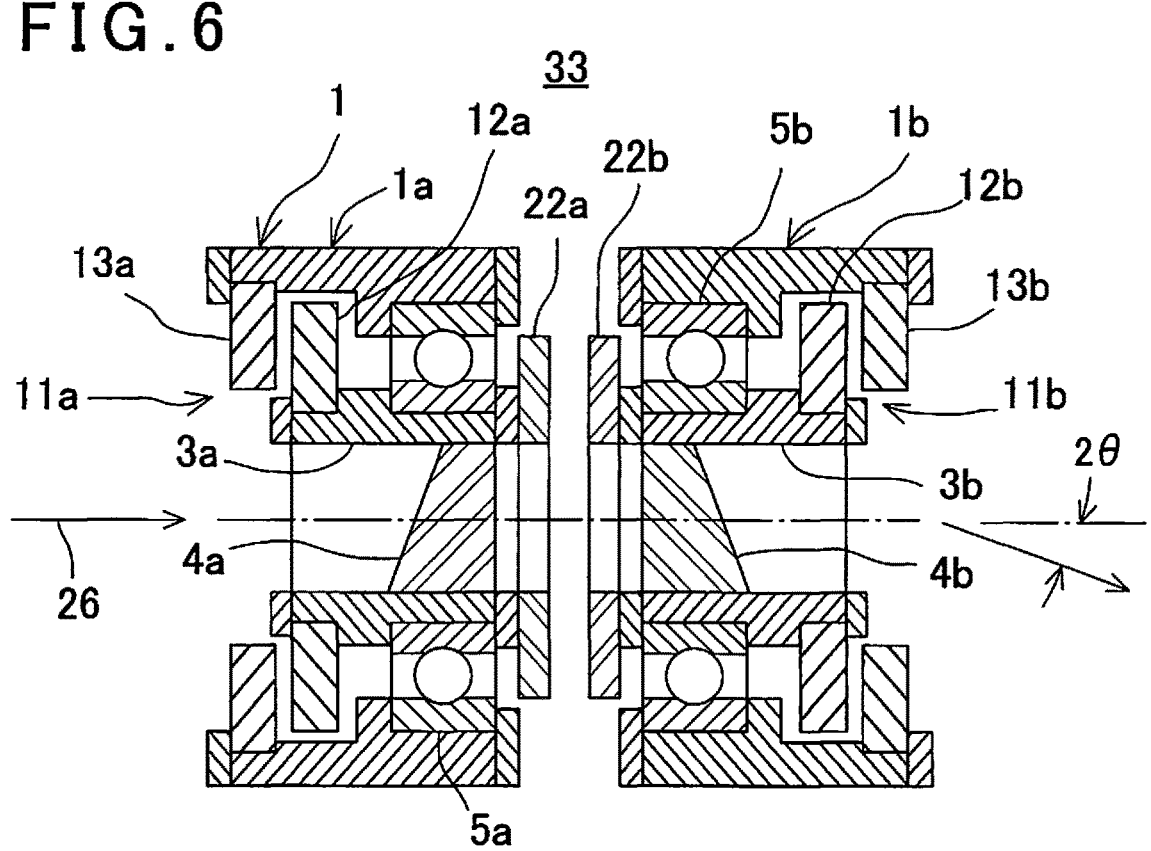
FIG. 6 is a cross-sectional view showing an application example of the present invention.

FIG. 6 shows a laser beam projecting unit 33 of an application example of the present invention.

In FIG. 6, what are equivalent to components as shown in FIG. 1 are referred by the same symbol, and detailed description thereof will be omitted.

In the laser beam projecting unit 33 of the present application example, two sets of the laser beam projecting units 1 shown in the first embodiment are provided tandem and symmetrically on the same axis. It is to be noted that the laser beam projecting units 1 do not necessarily have to be disposed symmetrically but may be provided in plural in the same attitude.

It is to be noted that a suffix "a" is given to a laser beam projecting unit 1 on the left side in the figure and a suffix "b" is given to a laser beam projecting unit 1 on the right side in the figure.

In the present application example, assuming that the single laser beam projecting unit 1a is capable of deflecting a laser beam at a deflection angle θ, the deflection at a maximum deflection angle 2θ becomes possible by combining two sets of the laser beam projecting units 1.

Further, by individually controlling the rotation of the laser beam projecting units 1a and 1b, scanning is made possible in various modes.

A description will be given by referring to FIG. 7A to FIG. 7C.

Figure 7A:
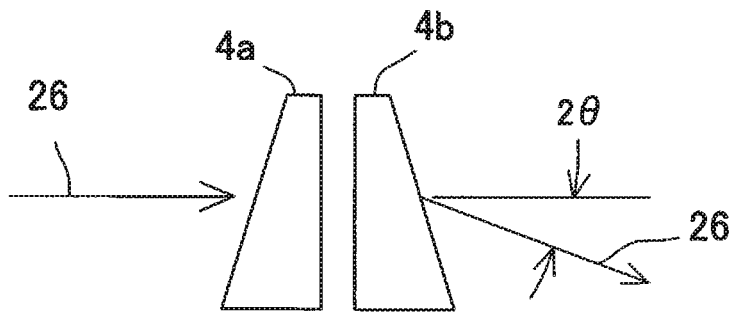
FIG. 7A to FIG. 7C are action explanatory drawings of a deflection in the application example.

FIG. 7A shows a state where the maximum deflection angle 2θ is obtained, and a position of a rotating direction (hereinafter referred as a rotational position) is set so that the respective deflecting directions of a prism 4a and a prism 4b match each other.

Figure 7B:
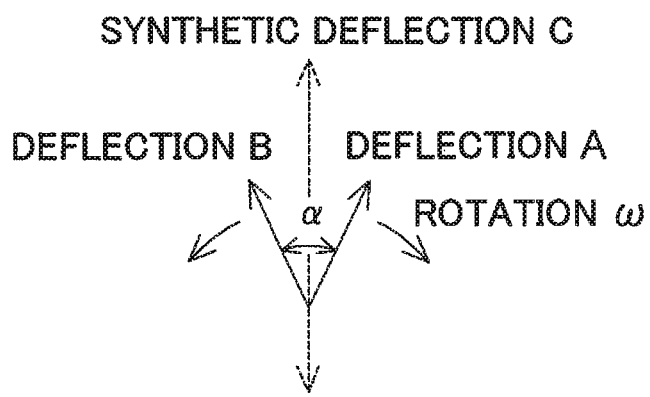

FIG. 7B shows a case of scanning in a linear direction, and by rotating the prisms 4a and 4b in opposite directions at an equal speed ω, a scanning locus becomes a straight line.

Figure 7C:
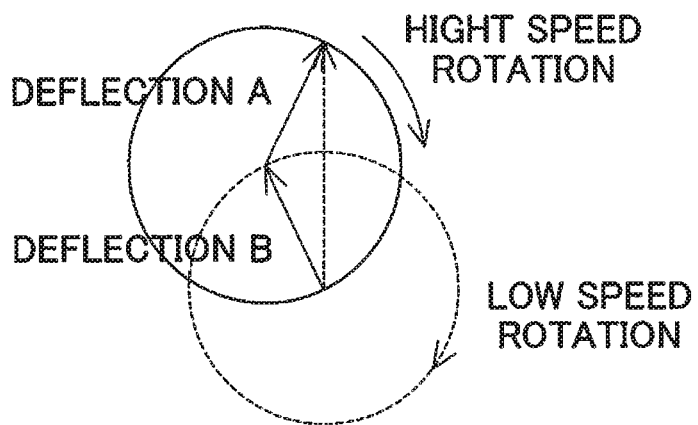

FIG. 7C shows a case where the prism 4a and the prism 4b are rotated in the same direction and, also one of the prism 4a and the prism 4b is rotated at a higher speed and the other of the prism 4a and the prism 4b is rotated at a lower speed. In this case, a scanning locus becomes a spiral.

Further, though not shown, when changing a deflection angle to a required angle, maintaining the deflection angle and integrally rotating the prisms 4a and 4b, a locus of a circle is obtained. Further, each time the deflection angle is changed, by integrally rotating the prisms 4a and 4b, a scanning locus of multiple concentric circles is obtained.

Depending on a combination of the rotational positions of the prism 4a and the prism 4b, the deflecting direction and the deflection angle of the laser beam 26 to be projected can be arbitrarily changed, and an arbitrary scanning locus is obtained.

Figure 8:
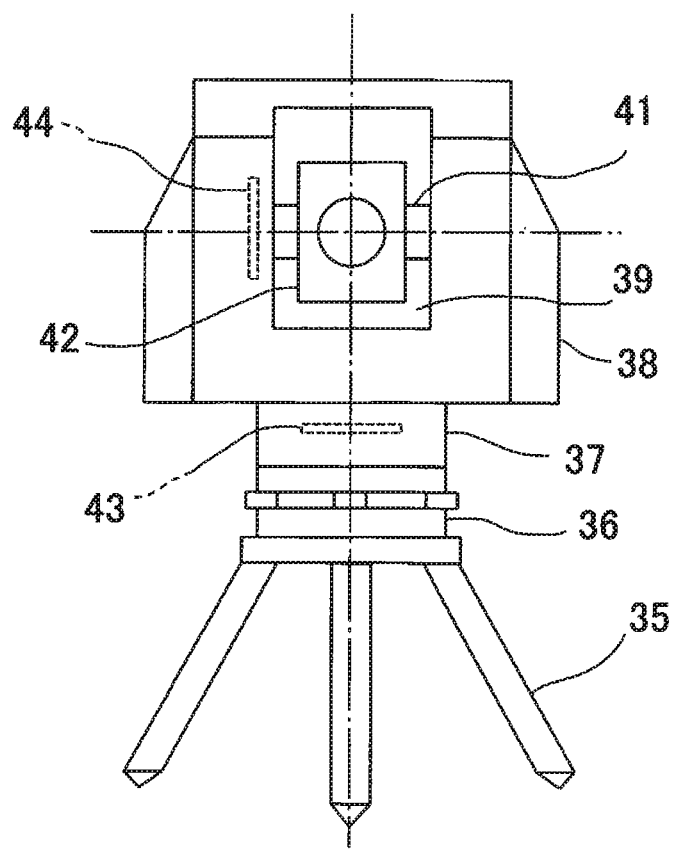
FIG. 8 is a schematical drawing of a surveying instrument according to an embodiment of the present invention.
Figure 9:
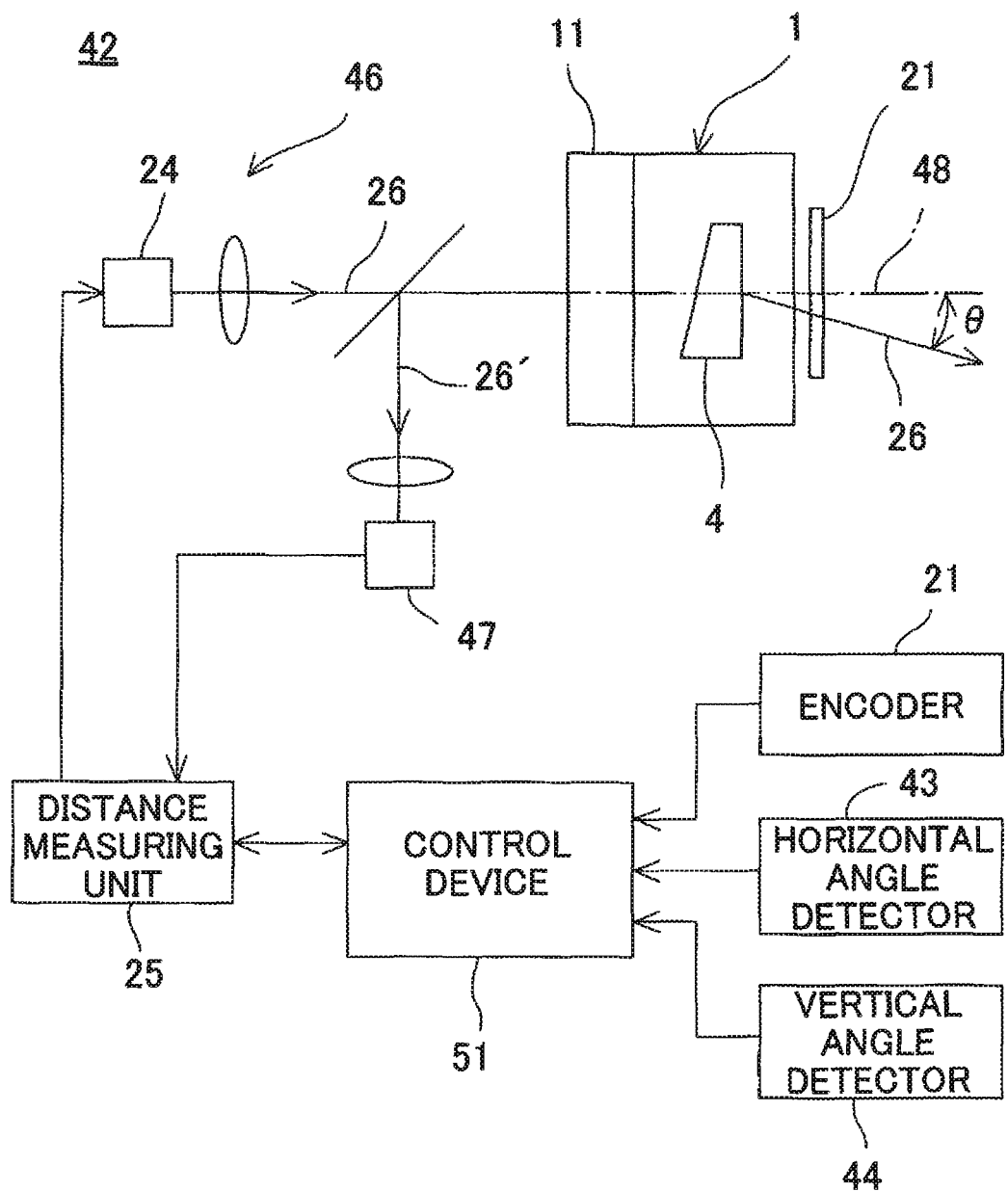
FIG. 9 is a block diagram showing an approximate arrangement of the surveying instrument.

FIG. 8 and FIG. 9 show general features of a surveying instrument including the laser beam projecting unit according to the present embodiment.

A tripod 35 is installed at a predetermined point, and a leveling unit 36 is provided on the tripod 35. On the leveling unit 36, a frame unit 38 is provided via a horizontal rotation unit 37. The frame unit 38 has a recessed portion 39 formed at a center portion and a laser beam projecting device 42 is rotatably supported in the recessed portion 39 via a vertical rotation shaft 41.

The frame unit 38 is rotated in a horizontal direction around a vertical axis by the horizontal rotating unit 37, and a horizontal rotation angle is detected by a horizontal angle detector 43. Further, the laser beam projecting device 42 is rotatable in a vertical direction around the vertical rotation shaft 41 and a vertical rotation angle is detected by a vertical angle detector 44.

In the laser beam projecting device 42, the laser beam projecting unit 1, a distance measuring optical system 46, the distance measuring unit 25 and the like are accommodated, and the laser beam projecting unit 1 is disposed on an optical axis 48 of the distance measuring optical system 46. Further, in the frame unit 38 or in the laser beam projecting device 42, a control device 51 is provided. The control device 51 controls the distance measuring unit 25, the horizontal rotation unit 37 and the laser beam projecting device 42 at a required timing to a required state, and performs measuring.

A description will be given on general features of the distance measuring optical system 46.

The distance measuring unit 25 drives the light emitting unit 24, and the laser beam 26 emitted from the light emitting unit 24 passes through the laser beam projecting unit 1 and is deflected at a deflection angle θ and is projected.

A reflected distance measuring light 26' reflected by an object to be measured is received by a light receiving element 47 and a light receiving signal is input into the distance measuring unit 25. In the distance measuring unit 25, a distance is calculated based on a difference between a light emitting timing of the laser beam 26 and a light receiving timing of the reflected distance measuring light 26'.

Further, a direction of the laser beam projecting device 42 (a direction of the optical axis 48 of the distance measuring optical system 46) is determined based on detection results of the horizontal angle detector 43 and the vertical angle detector 44, and a deflecting direction of the laser beam 26 with respect to the optical axis 48 can be calculated based on the detection result of the encoder 21. Therefore, a projecting direction of the laser beam 26 can be obtained based on the detection results of the horizontal angle detector 43, the vertical angle detector 44 and the encoder 21.

Thus, based on a distance measuring result by the distance measuring unit 25 and the projecting direction of the laser beam 26, a three-dimensional coordinate of the measuring point can be obtained, and a measurement equivalent to a total station can be performed.

Further, the distance measuring light projected from the distance measuring optical system 46 is scanned and point cloud data is obtained. The obtainment of the point cloud data may be performed in a pulse method, a phase difference method or a combination method of the pulse method and the phase difference method.

In a state where the optical axis 48 is fixed, when rotating the prism 4 by the axial gap-type motor 11, a uniaxial scanning of the laser beam 26 can be performed within a range of 2θ with respect to the optical axis 48, and further, when horizontally rotating the frame unit 38 by the horizontal rotation unit 37, the scanning in the horizontal direction within the range of the vertical angle 2θ can be performed, and the point cloud data in a wide range can be obtained by cooperating a rotation of the prism 4 and a horizontal rotation of the frame unit 38.

Further, by changing the vertical angle of the laser beam projecting device 42 at each horizontal rotation, the point cloud data can be obtained in a further wide range.

It is to be noted that the prism 4 is capable of the high-speed rotation by the axial gap-type motor 11 and the point cloud data can be obtained efficiently. Further, in a case where the deflection angle θ is made larger, the laser beam projecting device 42 does not have to be rotated in the vertical direction.

The invention claimed is:

1. A shaft support structure, wherein a rotation shaft is provided on a fixed portion via one bearing, a rotor of an axial gap-type motor is provided on one end portion of said rotation shaft, a stator of said axial gap-type motor is provided on said fixed portion so as to confront said rotor, and an attracting force between said rotor and said stator acts on said bearing as a pressurization.

2. A laser beam projecting unit, wherein a hollow rotation shaft is provided on a fixed portion via one bearing, a rotor of an axial gap-type motor is provided on one end portion of said rotation shaft, a stator of said axial gap-type motor is provided on said fixed portion so as to confront said rotor, an attracting force between said rotor and said stator acts on said bearing as a pressurization, an angle detector for detecting a rotation angle of said rotation shaft is provided on the other end portion of said rotation shaft, a deflection optical component is provided inside said rotation shaft, and a laser beam is projected through said deflection optical component.

3. The laser beam projecting unit according to claim 2, wherein said deflection optical component is a prism.

4. The laser beam projecting unit according to claim 2, wherein said deflection optical component is a Fresnel prism.

5. The laser beam projecting unit, wherein a plurality of the laser beam projecting units according to claim 2 are continuously provided on the same axis.

6. A surveying instrument comprising: a leveling unit, a horizontal rotation unit provided on said leveling unit, a frame unit provided on said horizontal rotation unit and rotatable in a horizontal direction, a horizontal angle detector for detecting a horizontal rotation angle of said frame unit and a laser beam projecting device supported by said frame unit, wherein said laser beam projecting device has a distance measuring unit for projecting a distance measuring light and for receiving a reflected distance measuring light from an object to be measured and for performing a distance measurement to the object to be measured, a control device, and said laser beam projecting unit according to claim 2 provided on an optical axis of said distance measuring unit and said distance measuring light is configured to be projected through said laser beam projecting unit, and wherein said control device obtains a three-dimensional coordinate of a measurement point based on a distance measurement result obtained by said distance measuring unit and detection results from said horizontal angle detector and said angle detector.

7. The surveying instrument according to claim 6, wherein said distance measuring light is scanned within a required range by cooperating the rotation of said deflection optical component by said axial gap-type motor and a horizontal rotation of said frame unit by said horizontal rotation unit and point cloud data of a required range is obtained by said distance measuring unit.

\* \* \* \* \*